US009864384B2

(12) United States Patent
Brantweiner et al.

(10) Patent No.: US 9,864,384 B2
(45) Date of Patent: Jan. 9, 2018

(54) CONTROL UNIT FOR A PRESSURE REGULATING VALVE

(71) Applicant: Magna Powertrain AG & Co KG, Lannach (AT)

(72) Inventors: Stefan Brantweiner, Bad Gams (AT); Franz Faschinger, Graz (AT)

(73) Assignee: MAGNA POWERTRAIN AG & CO KG, Lannach (AT)

( * ) Notice: Subject to any disclaimer, the term of this patent is extended or adjusted under 35 U.S.C. 154(b) by 0 days.

(21) Appl. No.: 14/394,526

(22) PCT Filed: Apr. 19, 2013

(86) PCT No.: PCT/EP2013/058174
§ 371 (c)(1),
(2) Date: Oct. 15, 2014

(87) PCT Pub. No.: WO2013/156599
PCT Pub. Date: Oct. 24, 2013

(65) Prior Publication Data
US 2015/0069277 A1    Mar. 12, 2015

(30) Foreign Application Priority Data
Apr. 19, 2012 (DE) .......... 10 2012 206 419

(51) Int. Cl.
*F16K 37/00* (2006.01)
*G05D 16/20* (2006.01)
(Continued)

(52) U.S. Cl.
CPC ......... *G05D 16/202* (2013.01); *F16K 37/005* (2013.01); *G05D 7/0635* (2013.01);
(Continued)

(58) Field of Classification Search
CPC .. F16K 1/0655; F16K 31/0675; F16K 27/029; F16K 31/02; F16K 31/0613;
(Continued)

(56) References Cited

U.S. PATENT DOCUMENTS 4,869,596 A * 9/1989 Klein ................. G01N 33/2847
188/1.11 E
4,974,622 A * 12/1990 Rader ..................... F02D 41/20
137/1
(Continued)

FOREIGN PATENT DOCUMENTS

CN    1222468 A    7/1999
DE    3843138 C2   6/1990
(Continued)

OTHER PUBLICATIONS

International Search Report dated Sep. 12, 2013 (PCT/EP2013/058174).
(Continued)

*Primary Examiner* — Matthew W Jellett
(74) *Attorney, Agent, or Firm* — Dickinson Wright PLLC (57) ABSTRACT

The invention relates to a control unit for a pressure regulating valve in a motor vehicle, preferably for a pressure regulating valve that adjusts the oil pressure, wherein a signal that corresponds to the pressure that is to be set can be transmitted to the control unit, the control unit is signal-connected on the output side to a pressure regulating valve for the fluid that is to be pressure adjusted, wherein the electrical current supply to the pressure regulating valve is provided by way of a PWM signal that is generated by means of the control unit and the control unit is embodied for the purpose of over-exciting the solenoid of the pressure regulating valve with a higher electrical current prior to influencing the pressure regulating valve with the electrical
(Continued)

current that is associated with the pressure that is to be set for a period of time.

22 Claims, 5 Drawing Sheets (51) Int. Cl.
  *H01F 7/06* (2006.01)
  *H01F 7/18* (2006.01)
  *G05D 7/06* (2006.01)
  *F02D 41/20* (2006.01)
  *F02D 41/38* (2006.01)

(52) U.S. Cl.
  CPC ............ *H01F 7/064* (2013.01); *H01F 7/18* (2013.01); *F02D 41/20* (2013.01); *F02D 41/3836* (2013.01); *F02D 2041/2027* (2013.01); *F02D 2200/023* (2013.01); *F02D 2200/024* (2013.01); *H01F 2007/1888* (2013.01)

(58) Field of Classification Search
  CPC ............ F16K 31/0686; F16K 37/0025; F16K 37/0041; F16K 37/005; G05D 16/202; G05D 7/0635; H01F 7/064; H01F 7/18; H01F 2007/1888; F02D 2041/2027; F02D 2200/023; F02D 2200/024; F02D 41/20; F02D 41/3836
  USPC ..................... 251/129.04, 129.05, 129.15
  See application file for complete search history.

(56) References Cited

U.S. PATENT DOCUMENTS

| | | | | |
|---|---|---|---|---|
| 6,155,654 A * | 12/2000 | Oyama | ............... | B60T 8/36 137/14 |
| 6,332,455 B1 * | 12/2001 | Sumida | ............... | F02D 41/20 123/490 |
| 6,374,783 B1 * | 4/2002 | Toriumi | ............... | F01L 9/04 123/90.11 |
| 6,478,051 B1 * | 11/2002 | Drumm | ............... | F15B 1/033 138/30 |
| 6,560,088 B1 * | 5/2003 | Beck | ............... | F01L 9/04 251/129.01 |
| 6,993,424 B2 * | 1/2006 | Shim | ............... | F16H 61/0251 251/129.15 |
| 7,011,379 B2 * | 3/2006 | Rader | ............... | B60T 8/36 303/119.2 |
| 8,176,895 B2 * | 5/2012 | Kusaka | ............... | F02D 31/007 123/357 |
| 2002/0096139 A1 * | 7/2002 | Zheng | ............... | F01L 1/146 123/198 F |
| 2004/0035469 A1 * | 2/2004 | Suzuki | ............... | B60T 8/36 137/552 |
| 2007/0153444 A1 | 7/2007 | Groh | | |
| 2008/0087254 A1 * | 4/2008 | Tanaka | ............... | F02D 41/20 123/472 |
| 2009/0005913 A1 | 1/2009 | Kissler | | |
| 2011/0282597 A1 * | 11/2011 | Traversa | ............... | F01M 11/10 702/50 |

FOREIGN PATENT DOCUMENTS

| | | |
|---|---|---|
| DE | 4024496 A1 | 2/1992 |
| DE | 19533131 A1 | 3/1997 |
| DE | 60108998 T2 | 7/2005 |
| DE | 202005018018 U1 | 10/2006 |
| DE | 10361668 B4 | 1/2008 |
| DE | 102006061105 A1 | 6/2008 |
| DE | 102007000854 A1 | 7/2008 |
| DE | 102010024585 A1 | 12/2010 |
| DE | 102010020757 A1 | 11/2011 |
| EP | 0006843 B2 | 4/1983 |
| EP | 1201898 B1 | 7/2004 |
| EP | 1291540 B1 | 10/2004 |
| JP | 2000303882 A | 10/2000 |
| WO | 2009015155 A1 | 1/2009 |

OTHER PUBLICATIONS

Search Results dated Oct. 17, 2016 from the State Intellectual Property Office in corresponding Chinese Patent Application No. 201380020942X.

* cited by examiner

CONTROL UNIT FOR A PRESSURE REGULATING VALVE

CROSS-REFERENCE TO RELATED APPLICATIONS

This application claims priority to German Application No. DE 102012206419.2, filed on Apr. 19, 2012 at the German Patent Office and which is a national phase of the International Application No. PCT/EP2013/058174, filed on Apr. 19, 2013, which are all hereby incorporated by reference.

TECHNICAL FIELD

The invention relates to a control unit for a pressure regulating valve in a motor vehicle, preferably for a pressure regulating valve that adjusts the oil pressure conveyed by a pump. An input signal that corresponds to a desired oil pressure value that is to be set can be transmitted to an input side of the control unit. The control unit is signal-connected on an output side to the pressure regulating valve such that an electrical current supply to the pressure regulating valve is provided by way of a PWM signal that is generated by the control unit. The control unit is operable for the purpose of initially over-exciting a solenoid of the pressure regulating valve with a first, higher electrical current prior to influencing the pressure regulating valve with a second, lower electrical current that is associated with the desired oil pressure that is to be set for a period of time.

BACKGROUND

A pressure regulating valve is used to adjust the pressure of a fluid that is being conveyed under pressure to an intended pressure that can be predetermined by means of adjusting a spring tension or electrically by means of supplying a voltage to an electromagnet. The fluid being provided by a pump is subjected to a reduced pressure, the pressure being reduced by way of a controllable valve body to the intended pressure, wherein, if the pressure is too high, fluid is discharged from the pump line and respectively redirected back to the pump.

Automobile applications relating to the engine or transmission require that electrically controllable pressure regulating valves always demonstrate the identical control behavior within a large temperature range. It can be problematic when adjusting small pressures in the case of pressure regulating valves that have small dimensions and a low magnetic force characteristic curve. In the case of low temperatures (e.g. −20° C.), long switching times occur as a result of the high oil viscosity. In the case of a low temperature inter alia, it is not even possible to set low pressures since the valve body is not activated by way of the magnet and the valve consequently remains open.

DE 10 2010 024 585 A1 describes a solenoid valve having a solenoid, an armature that is connected to a valve member, and an oil-filled valve chamber in which the armature is arranged. In order to ensure good adjusting dynamics, the armature is mounted in a moveable manner in the oil of the system, wherein, in order to reduce the oil viscosity, the solenoid heat generated by the electrical current causes the temperature of the oil in the valve chamber to rise.

A control unit for a solenoid valve is known from EP 0 006 843 B2. In order to increase the activation force, the electrical current being directed through the solenoid is increased for a short period of time by means of a particular electronic switching process.

DE 601 08 998 T2 describes a control system for controlling an electromagnetic valve that comprises a solenoid pair, an element that is arranged in a moveable manner in the chamber between the solenoids, a valve body and also resilient means that in the case of non-energized solenoids hold the moveable element in a central position. During an initialization phase, the influence of the viscosity is ascertained by way of analyzing the oscillating behavior in the case of this particular valve and the electrical current required to control the valve is determined. In addition, the oil temperature is subsequently determined.

DE 38 43 138 C2 discloses a method for controlling and detecting the movement of an armature of an electromagnetic switching element of a valve. The change with respect to time of the voltage or rather of the electrical current is detected for the purpose of recognizing the termination of the armature movement.

DE 10 2006 061 105 A1 discloses a specially constructed valve for a cam shaft adjuster. The electromagnet is electrically energized by means of switching the voltage supply on and off within a predetermined time interval.

DE 20 2005 018 018 U1 describes a brake system having a piston-cylinder unit. The piston-cylinder unit is used to build-up and reduce braking pressure, to achieve the ABS function and the anti-slip control. The movement of the brake pedal is detected and taken into consideration when electrically controlling the electromagnetically controllable valve. The rotational acceleration of the wheel is likewise taken into consideration for the purpose of reducing the pressure, for reducing the braking effect.

In the case of the switching arrangement for operating the solenoid valves in accordance with DE 40 24 496 A1, a first control member is provided for applying an activation voltage and a second control member is provided for applying a lower operating voltage. An electrical current sensing member is provided in the operating current circuit and said electrical current sensing member adjusts the magnitude of the operating voltage in dependence upon the ascertained operating current.

DE 195 33 131 A1 describes a method for controlling an electromagnetic consumer—a solenoid valve of a diesel injection pump. The control voltage of an end stage is regulated during the switch-on phase until a switch-on peak electrical current achieves a predetermined value. The holding current is subsequently reduced in repeating steps to a predetermined value. This value is held constant for a period of time—subsequently, the electrical current is increased in order to initiate a switch-off phase.

A method for ascertaining a viscosity characteristic variable of a motor oil, which is described in DE 10 2010 020 757 A1, uses the valve switching times as a measure for the viscosity of the medium that is to be switched.

SUMMARY

The object of the present invention resides in improving a control unit for a pressure regulating valve with respect to known control units.

This object is achieved by virtue of the features of claim 1. Specifically, a control unit for a pressure regulating valve in a motor vehicle, preferably for a pressure regulating valve is provided that adjusts the oil pressure conveyed by a pump. A signal that corresponds to a desired oil pressure value that is to be set can be transmitted to an input side of the control unit. The control unit is signal-connected on an output side to the pressure regulating valve such that an electrical current supply to the pressure regulating valve is provided by way of a PWM signal that is generated by the control unit. The control unit is configured and operable for the purpose of over-exciting a solenoid of the pressure regulating valve with a first, higher electrical current prior to influencing the pressure regulating valve with a second, lower electrical current that is associated with the pressure that is to be set for a period of time.

Further developments are evident in the subordinate claims.

The invention provides a control unit, wherein the pressure regulating valve that is signal-connected to the control unit is switched by way of a PWM (Pulse Width Modulation) signal. It is provided that an electrical current over-excitation in the solenoid of the pressure regulating valve is produced by the PWM signal, as a consequence of which a valve body of the pressure regulating valve is moved in an accelerated manner into the intended operating range.

The high oil viscosity that occurs in the case of low temperatures causes a great damping of the valve body and consequently of the armature that is to be moved with respect to the solenoid. It is possible by virtue of an electrical current over-excitation of the solenoid to considerably minimize the switch-on time, the response time in the case of a low temperature and corresponding thick oil, in other words to considerably minimize the length of time required for the valve body of the pressure regulating valve to achieve the corresponding position for the desired pressure value that is to be set. This is then in particular of advantage if the set pressure lies within a small range of end pressure of the entire pressure range.

One embodiment of the invention provides that the control unit comprises programmed time intervals that are selected in dependence upon the desired pressure value that is to be regulated and the time intervals predetermine the period of time of the electrical current over-excitation of the solenoid of the pressure regulating valve. It is thus possible to provide that in the case of lower pressure values a different period of time for the electrical current over-excitation is provided than in the case of higher pressure values. This embodiment can provide as a further development or as an alternative thereto that different desired pressure values that are to be set are allocated different electrical current over-excitation values. It is thus possible that in the case of lower pressure values a different set value is predetermined for the electrical current over-excitation than in the case of higher pressure values. Accordingly, for the purpose of setting a low pressure value, the pressure regulating valve is influenced by a different PWM signal than for the purpose of setting a higher pressure value.

In accordance with a further development of the invention, it is provided that the input side of the control unit is in signal-connection with a temperature sensor that is operable to detect the temperature of the fluid namely the oil that is to be pressure regulated. In dependence upon the temperature of the fluid, the control unit then influences the control of the pressure regulating valve in such a manner that in the case of low temperatures and consequently a higher viscosity the magnitude of the over-excitation of the electrical current is greater. Alternatively, the temperature of the fluid that is to be pressure regulated can also be estimated using a model, for which purpose in particular a temperature value is used that has been detected at a different location. Finally, it is also possible that the resistance value of the solenoid of the pressure regulating valve that changes with the temperature can be used in order to determine the temperature, for which purpose the control unit ascertains the resistance value and from that value determines the temperature. Independently of determining the temperature, it is possible to provide also that the period of time for the intended over-excitation is selected in dependence upon the previously described ascertained temperature values.

DESCRIPTION

Furthermore, the implementation of the invention is explained hereinunder with reference to the drawings.

Figure 1:
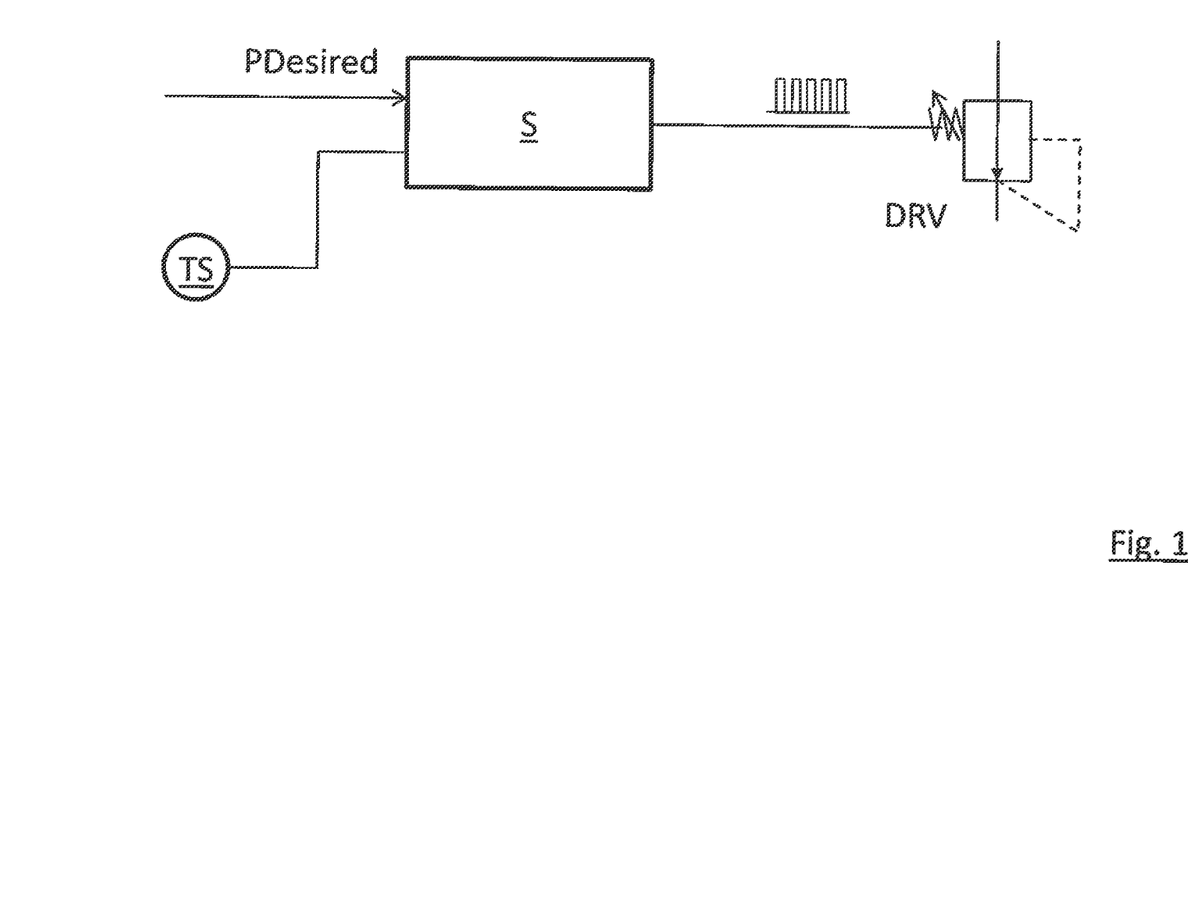
FIG. 1 illustrates a fluid control system having a control unit configured to control actuation of an electrically-controlled pressure regulating valve and operable to provide an electrical current over-excitation function in accordance with the present invention.

FIG. 1 illustrates a fluid control system having a control unit S in accordance with the invention that is signal-connected to a pressure regulating valve PRV by way of a first signal line. The control unit S is signal-connected to a temperature sensor TS by way of a second signal line. The temperature sensor TS detects the temperature of the oil of a motor, not illustrated, or rather of a transmission. In addition, a signal is forwarded to the control unit S by way of a further signal line and said signal corresponds to a desired pressure value $P_{Desired}$ to which the oil being conveyed by a pump is to be pressure regulated by way of the pressure regulating valve. This pressure signal $P_{Desired}$ is generated by a motor, not illustrated, or rather a transmission control.

Electrical current values for the pressures that are to be set are stored in the control unit S and said electrical current values are output in the form of PWM signals (PWM=Pulse Width Modulation) and accordingly adjust the position of a valve body of the pressure regulating valve PRV by way of excitation of a solenoid. These electrical current values are described as a "holding current" since it is these electrical current values that move the valve body into position at the pressure regulating value intended for the pressure regulation, in other words the valve body is influenced with the amount of force that represents the pressure corresponding to the regulation. Due to the inertia of an armature within the solenoid, the time mean value of the PWM signal, in other words the mean electrical current value that excites the solenoid is determined by means of the pulse length of the PWM signal. The electrical current value usually changes as in the case of the PWM signals, between two fixed values—the effective electrical current supply is provided by means of the pulse width, in other words the duration with respect to time of the electrical current pulses.

If the pressure regulating valve PRV is to be set to a new pressure value by way of the control unit S, then the solenoid of the pressure regulating valve PRV is over-excited in a first time interval—the solenoid is influenced with an electrical current value that is greater than the subsequent holding current. This first time interval is described as an over-excitation interval and is predetermined by the control unit in dependence upon the temperature that has been detected by means of the temperature sensor. Likewise in dependence upon the detected oil temperature, the control unit S predetermines the magnitude of the electrical current that causes the over-excitation—also in this case by way of the PWM signal that is influencing the solenoid—at this stage with a greater pulse length, which effectively corresponds to a higher electrical current.

Figure 2:
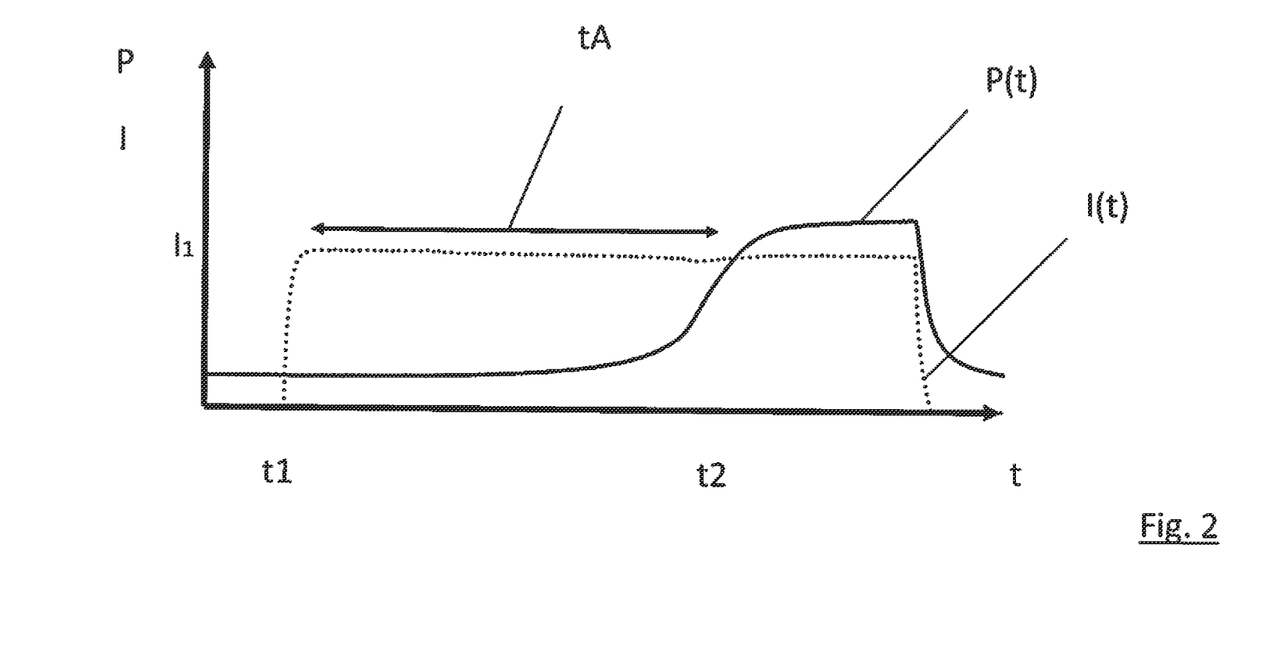
FIG. 2 illustrates example behavior characteristics of a pressure regulated valve controlled by a conventional control unit.

FIG. 2 illustrates the behavior in the case of a conventional control unit of a pressure regulating valve in a pressure-time or rather electrical current-time graph. The horizontal axis t indicates the time—the vertical axis indicates the pressure p or rather the electrical current value I that is to be applied at the pressure regulating valve—the solenoid of the pressure regulating valve—for the purpose of regulating the pressure. At the point in time t1, the solenoid of the pressure regulating valve is influenced with an electrical current I1 and this electrical current value I1 is maintained for a predetermined period of time. The dotted line indicates the progression of the applied electrical current I(t).

It is evident that the pressure regulating valve, the armature and also the valve body coupled thereto only react in a time-delayed manner in the case of low temperatures so that the pressure value p(t) only achieves up to approximately 90% of the intended pressure at the point in time t2. The continuous line indicates the time progression of the pressure p(t). As a result of the high viscosity of the oil to be regulated, said high viscosity being as a result of the low temperature, the pressure regulation is delayed by the time value tA=t2−t1.

Figure 3:
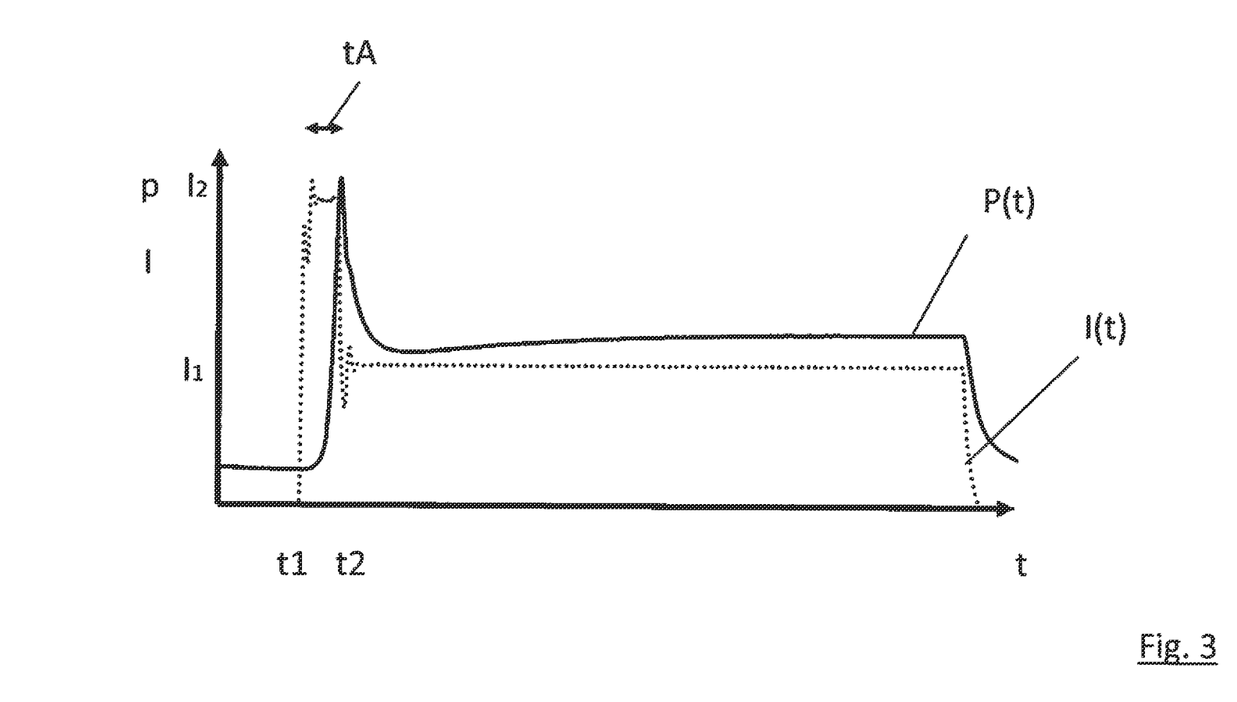
FIG. 3 illustrates example behavior characteristics of the pressure regulating valve controlled by the control unit of the present invention.

FIG. 3 indicates the control unit that is provided in accordance with the inventions of the pressure regulating valve with over-excitation. At the point in time t1, the solenoid of the pressure regulating valve is influenced for a short period of time by an electrical current value I2—the over-excitation current—that is greater than the electrical current value I1 or holding current that corresponds to the regulating pressure value. Subsequently, the electrical current value is reduced to I1, the holding current—at this stage the valve sets the intended pressure value. By virtue of the over-excitation with the higher electrical current value I2>I1, the pressure regulating valve reacts noticeably more quickly—the time value tA=t2−t1 for the reaction to the predetermined desired pressure value is considerably shorter than in the case without over-excitation.

By virtue of the over-excitation in accordance with the invention, the pressure regulating valve follows an electrically predetermined pressure value noticeably more quickly than in the case of a conventional control unit without over-excitation. Also, a constant controlling behavior is achieved by virtue of the over-excitation and this becomes evident in a small hysteresis in the case of low temperatures of the oil to be pressure regulated. This is explained in short with reference to FIGS. 4 and 5.

Figure 4:
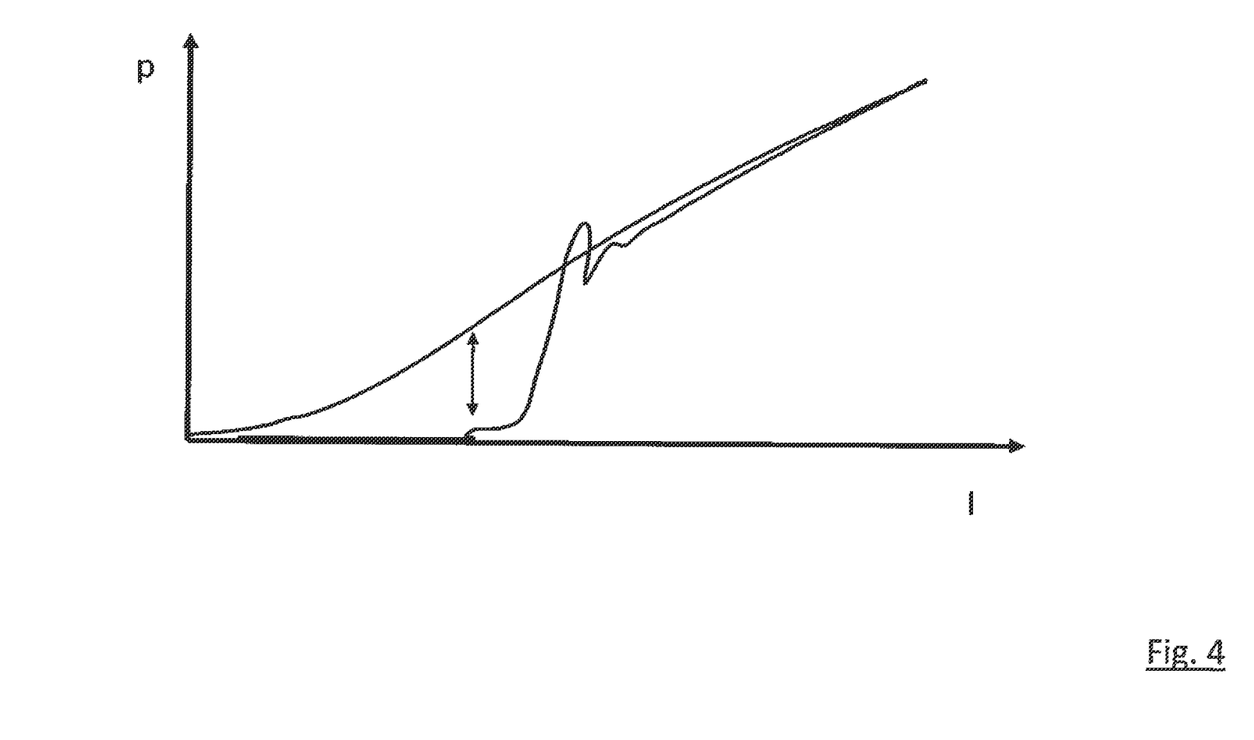
FIG. 4 illustrates an example pressure versus electric current characteristic curve with large hysteresis associated with the pressure regulating valve controlled by the conventional control unit.
Figure 5:
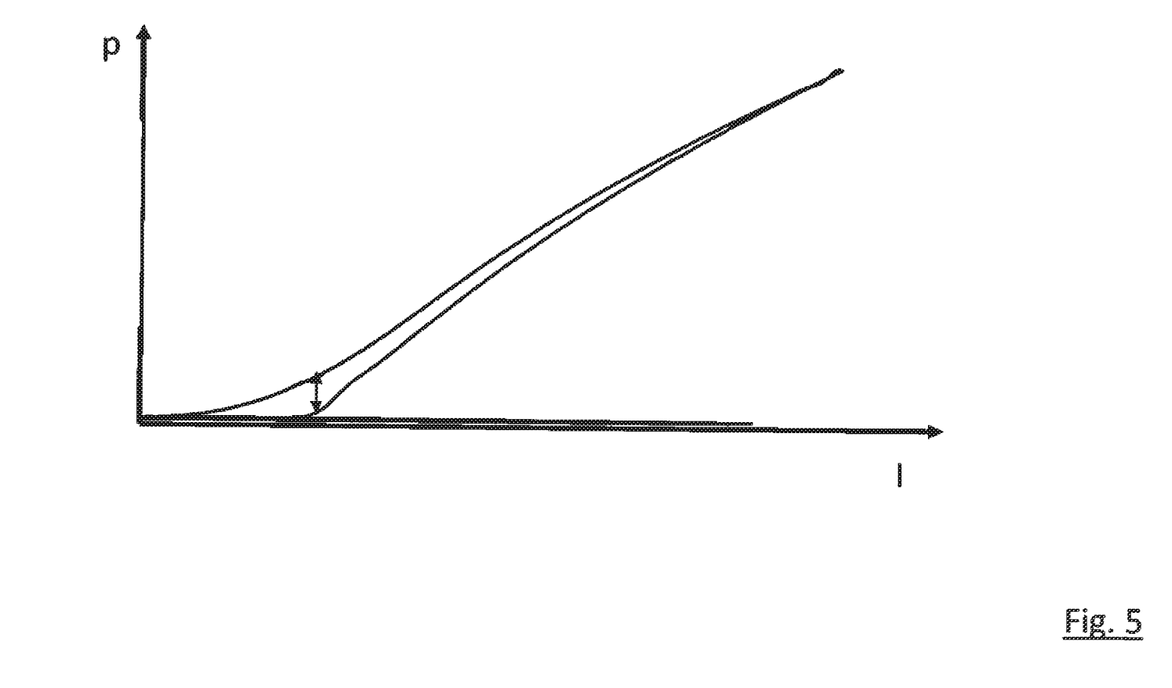
FIG. 5 illustrates an example pressure versus electric current characteristic curve with reduced hysteresis associated with the pressure regulating valve controlled by the control unit of the present invention.

FIG. 4 illustrates the pressure-electrical current characteristic curve of a conventionally controlled pressure regulating valve. The electrical current value I is plotted on the horizontal axis and the pressure p that can be regulated in each case by means of influencing the pressure regulating valve with the electrical current I is plotted on the vertical axis. In the conventional manner, the hysteresis is determined in that the pressure values p that arise in the case of an increasing and subsequently reducing electrical current value I are detected and are plotted with respect to one another in the form of a characteristic curve. By virtue of the described inertia—caused by the high viscosity of the oil in the case of low temperatures—an inconsistent control behavior is produced—a large hysteresis. In contrast thereto, FIG. 5 illustrates a small hysteresis—the control behavior of the pressure regulating valve that is controlled by the over-excitation is constant. The hysteresis is indicated in each case in FIGS. 4 and 5 by the double arrow.

LIST OF REFERENCE SIGNS

S Control Unit
PRV Pressure Regulating Valve
TS Temperature Sensor
$P_{Desired}$ Desired Pressure Value
p Pressure
I Electrical Current
t Time
p(t) Pressure variation with respect to Time
I(t) Electrical current variation with respect to Time

What is claimed is:

1. A control unit for controlling actuation of an electrically-controlled pressure regulating valve to adjust a fluid pressure of an oil conveyed by a pump, wherein the control unit provides an electrical current supply to a solenoid of the pressure regulating valve in the form of a PWM output signal based on a desired fluid pressure input signal provided to the control unit from one of a motor control or transmission control and which is indicative of a desired fluid pressure value for the oil regulated by the pressure regulating valve, wherein a temperature sensor connected to the control unit provides a fluid temperature input signal indicative of a fluid temperature of the oil, wherein the control unit is operable to initially provide a first, higher electrical current output signal to over-excite the solenoid of the pressure regulating valve and then subsequently provide a second, lower electrical current output signal that is associated with the desired fluid pressure value wherein the magnitude of the first, higher electrical current output signal is determined by the control unit based on the fluid temperature detected by the temperature sensor to render the control behavior of the pressure regulating valve constant when the determined fluid temperature of the oil is low and the viscosity of the oil is high.

2. The control unit as claimed in claim 1, wherein the first, higher electrical current output signal has a first time interval and the second, lower electrical current output signal has a second time interval, and wherein the second time interval is greater than the first time interval.

3. The control unit as claimed in claim 2, wherein the control unit is signal-connected to the pressure regulating valve by a first signal line, wherein the input signal indicative of the desired fluid pressure value is signal-connected to the control unit by a second signal line, and wherein the temperature sensor is signal-connected to the control unit by a third signal line.

4. The control unit as claimed in claim 3, wherein the first time interval is determined by the control unit based on the fluid temperature detected by the temperature sensor.

5. The control unit as claimed in claim 1, wherein the magnitude of the first, higher electrical current output signal increases as the fluid temperature decreases.

6. The control unit as claimed in claim 2, wherein the control unit provides a plurality of different first time intervals that are selected dependent on the magnitude of the desired fluid pressure value.

7. The control unit as claimed in claim 6, wherein increasing first time intervals are provided for increasing desired fluid pressure values.

8. The control unit as claimed in claim 2, wherein the first time interval is determined based on a temperature of the oil to be regulated by the pressure regulating valve, and wherein the fluid temperature is estimated using a model stored by the control unit.

9. The control unit as claimed in claim 2, wherein the first time interval is a function of a temperature of the oil to be regulated, and wherein the fluid temperature is determined by the control unit based on a resistance value of the solenoid of the pressure regulating valve.

10. The control unit as claimed in claim 2, wherein the first time interval is selected by the control unit based on a temperature of the oil that is pressure regulated.

11. The control unit as claimed in claim 1, wherein the control unit provides a plurality of first, higher electrical current output signals of different magnitudes that are each allocated to a corresponding value of the desired fluid pressure value.

12. The control unit as claimed in claim 1, wherein the magnitude of the first, higher electrical current output signal is determined by the control unit based on a temperature of the oil that is pressure regulated.

13. A fluid control system, comprising:
a pump configured to convey an oil to a motor or transmission;
a pressure regulating valve arranged to adjust a fluid pressure of the oil conveyed by the pump, the pressure regulating valve having a solenoid; and
a control unit providing an electrical current supply to the solenoid in the form of a PWM output signal;
wherein a desired fluid pressure input signal is provided to the control unit from one of a motor control or transmission control and which is indicative of a desired fluid pressure value for the oil regulated by the pressure regulating valve,
wherein a temperature sensor is connected to the control unit and provides an fluid temperature input signal indicative of a fluid temperature of the oil regulated by the pressure regulating valve,
wherein the control unit is operable to initially provide a first higher electrical current output signal to the solenoid to over-excite the solenoid and then subsequently provide a second lower electrical current output signal to the solenoid that is associated with the desired fluid pressure value of the oil,
wherein the magnitude of the first, higher electrical current output signal is determined by the control unit based on the fluid temperature detected by the temperature sensor to render the control behavior of the pressure regulating valve constant when the determined fluid temperature of the oil is low and the viscosity of the oil is high.

14. The fluid control system as claimed in claim 13, wherein the first higher electrical current output signal has a first time interval and the second lower electrical current output signal has a second time interval, and wherein the second time interval is greater than the first time interval.

15. The fluid control system as claimed in claim 14, wherein the control unit is signal-connected to the pressure regulating valve by a first signal line, wherein the desired fluid pressure input signal is signal-connected to the control unit by a second signal line, and wherein the temperature sensor is signal-connected to the control unit by a third signal line and provides the fluid temperature input signal indicative of the temperature of the oil.

16. The fluid control system as claimed in claim 15, wherein the first time interval is determined by the control unit based on the fluid temperature detected by the temperature sensor.

17. The fluid control system as claimed in claim 16, wherein the magnitude of the first higher electrical current output signal is determined by the control unit based on the fluid temperature detected by the temperature sensor.

18. The fluid control system as claimed in claim 13, wherein the control unit provides a plurality of different first time intervals that are selected dependent on the magnitude of the desired pressure value.

19. The fluid control system as claimed in claim 18, wherein increasing first time intervals are provided for increasing desired pressure values.

20. The fluid control system as claimed in claim 13, wherein the control unit provides a plurality of first higher electrical current output signals of different magnitudes that are each allocated to a corresponding value of the desired fluid pressure value.

21. The fluid control system as claimed in claim 13, wherein the first time interval is determined based on a temperature of the oil to be regulated by the pressure regulating valve, and wherein the fluid temperature is estimated using a model stored by the control unit.

22. The fluid control system as claimed in claim 14, wherein the first time interval is a function of a temperature of the oil to be regulated, and wherein the fluid temperature is determined by the control unit based on a resistance value of the solenoid of the pressure regulating valve.

* * * * *